June 23, 1970  C. A. HILLAIRET ET AL  3,516,320
ELECTRONIC HARMONICA WITH INDIVIDUAL REED PICKUPS
AND TONE GENERATOR SYSTEM
Filed April 1, 1968  5 Sheets-Sheet 3
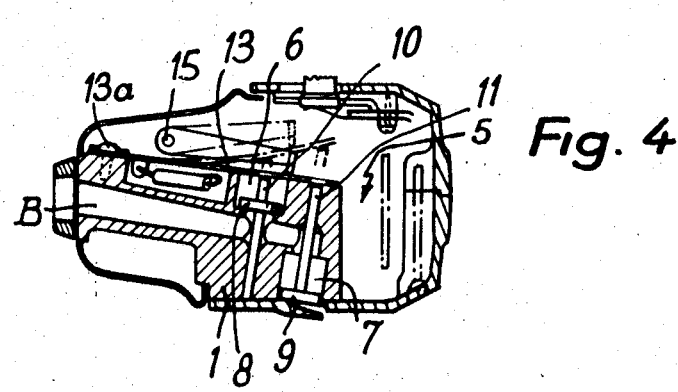
Fig. 4
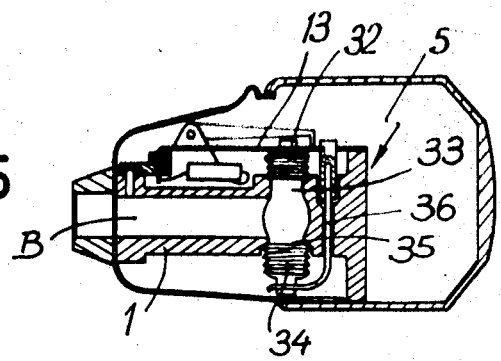
Fig. 5
Fig. 6  Fig. 7
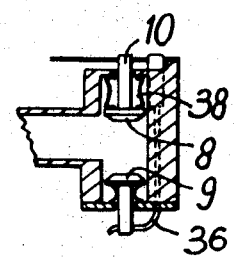 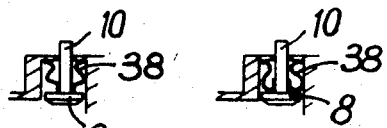
Fig. 8  Fig. 9
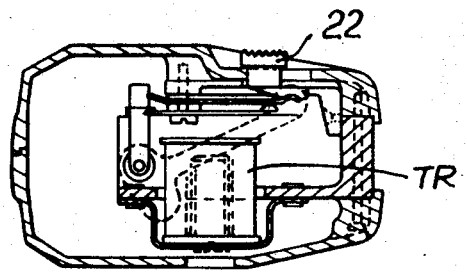
Fig. 10

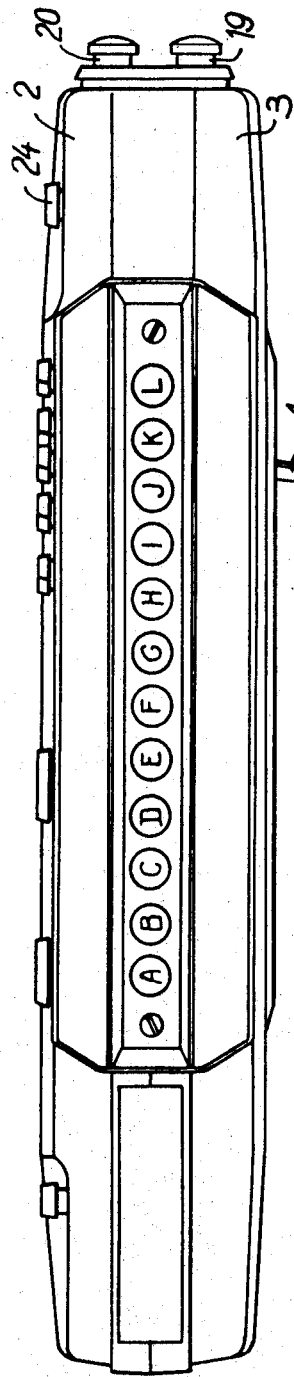
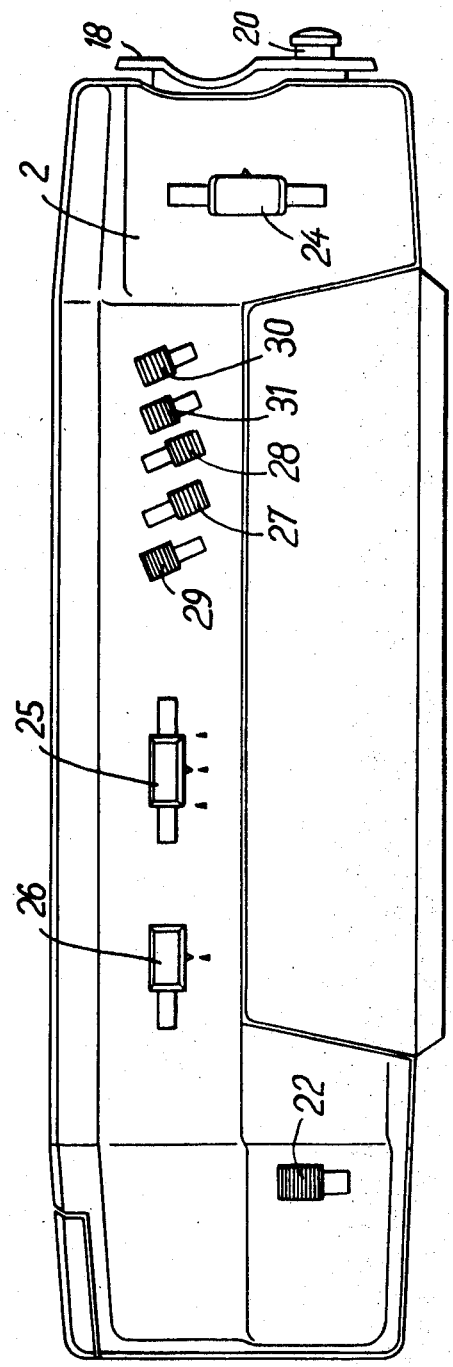

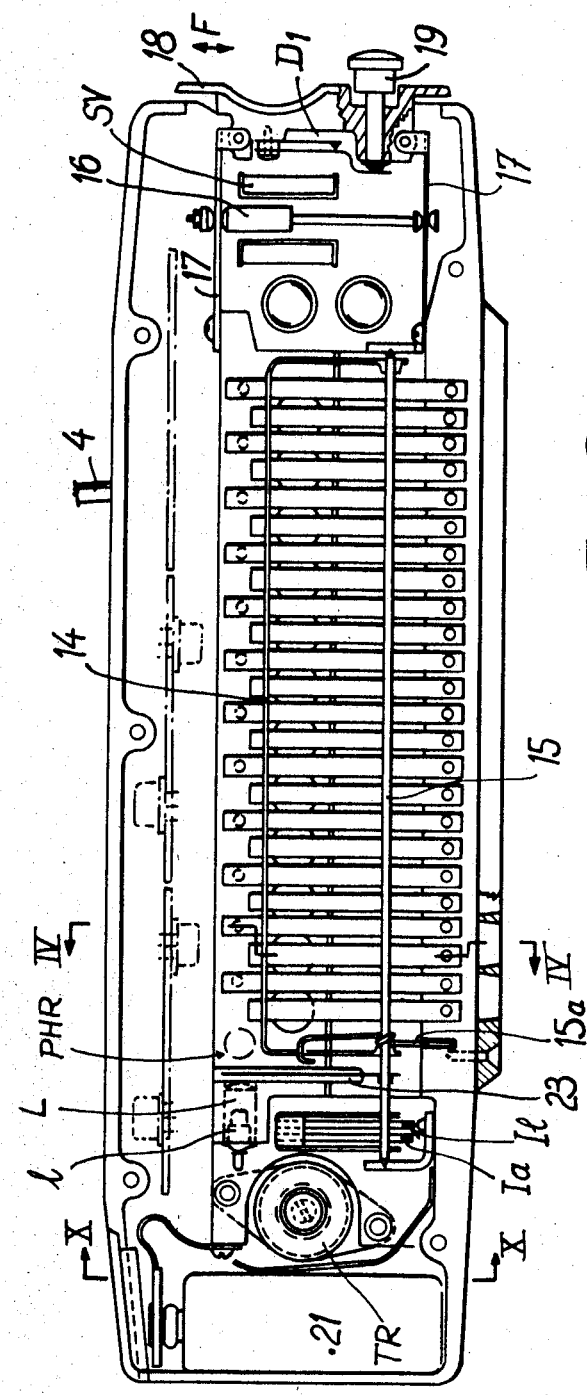

United States Patent Office 3,516,320
Patented June 23, 1970

3,516,320
ELECTRONIC HARMONICA WITH INDIVIDUAL REED PICKUPS AND TONE GENERATOR SYSTEM
Claude A. Hillairet, 42 Rue de Reims, Sartrouville, Yvelines, France, and Jean H. M. Lecadre, 88 Boulevard Richard Wallace, Puteaux, Hauts-de-Seine, France
Filed Apr. 1, 1968, Ser. No. 728,099
Claims priority, application France, Mar. 31, 1967, 100,973
Int. Cl. G10d 7/12, 9/00; G10h 5/04
U.S. Cl. 84—1.06
12 Claims

ABSTRACT OF THE DISCLOSURE

An electronic harmonica incorporating an air pressure sensitive device, e.g., bellows or pistons, and an electronic circuit and tone generator containing a variable value resistor string, the effective value of which is modified by movements of leaves disposed at the inner ends of the playing holes. These movements are produced by the pressure sensitive device as a result of pressure changes produced in the holes during playing and the pressure changes are transformed by an oscillator in said circuit into electrical oscillations which depend on the effective value of said resistor string and thus correspond to the desired note. The circuitry includes voltage dividers and a lamp-shutter-photoresistor arrangement. Manual vibrato control is provided, and various buttons may be used to select attack, filters, and octaves.

This invention relates to a new musical instrument, which will be referred to as an electronic harmonica, in which the volume of sound obtainable is no longer limited by the breathing capability of the player and which has a much wider available range of tone quality and expression than a conventional harmonica.

It will be recalled that the ordinary chromatic harmonica is a mouth instrument having a row of holes, each hole communicating with a reed. The reed vibrates under the breathing action of the player, who blows or sucks on the appropriate hole to produce the desired note.

An ordinary harmonica can produce three or four octaves and by operating a slide the holes can be made to communicate with other vibrating reeds so as to sharpen or raise the notes by a semi-tone. The electronic harmonica of the invention enables all the notes of the register to be raised by a semi-tone and also by a whole tone (double sharpening). This enables whole tone trills to be produced, which is not possible with a conventional harmonica. The harmonica of the invention has other useful possibilities which will appear from the description following later.

An electronic harmonica according to the invention comprises in combination an air pressure sensitive device disposed in each hole and including an element movable in response to air pressure variation, each element being arranged to produce corresponding movements in a respective one of a plurality of leaves, and an electronic circuit comprising a least one oscillator stage including a variable value electronic component the effective value of which is modified by the movement of each leaf.

In one embodiment of the invention the device in each hole is a double deformable bellows having a rod at each end cooperating with the leaf associated with the hole, one portion of the bellows expanding under the effect of an air pressure increase and the other portion contracting under the effect of a decrease in pressure, in both cases in a direction such as to raise the corresponding leaf.

A small air passage is preferably provided leading into each hole and by-passing the air pressure sensitive device disposed in the hole.

In a preferred embodiment of the invention, the variable value component is constituted by a group of ohmic resistances connected in series, and relays operated by the leaves are connected in parallel between each of the ends of the individual resistances and a common conductor.

Figure 11:
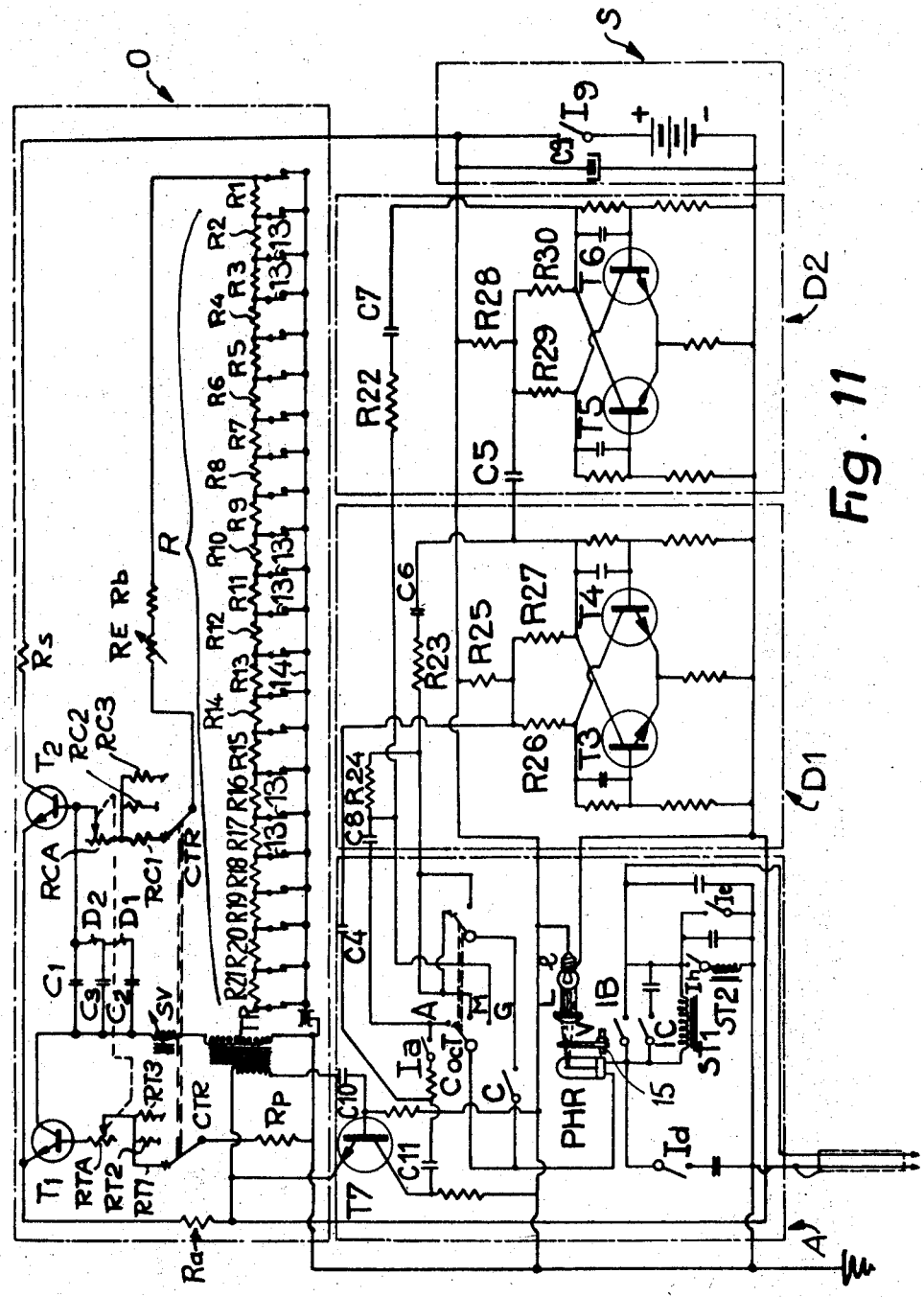
Figure 12:
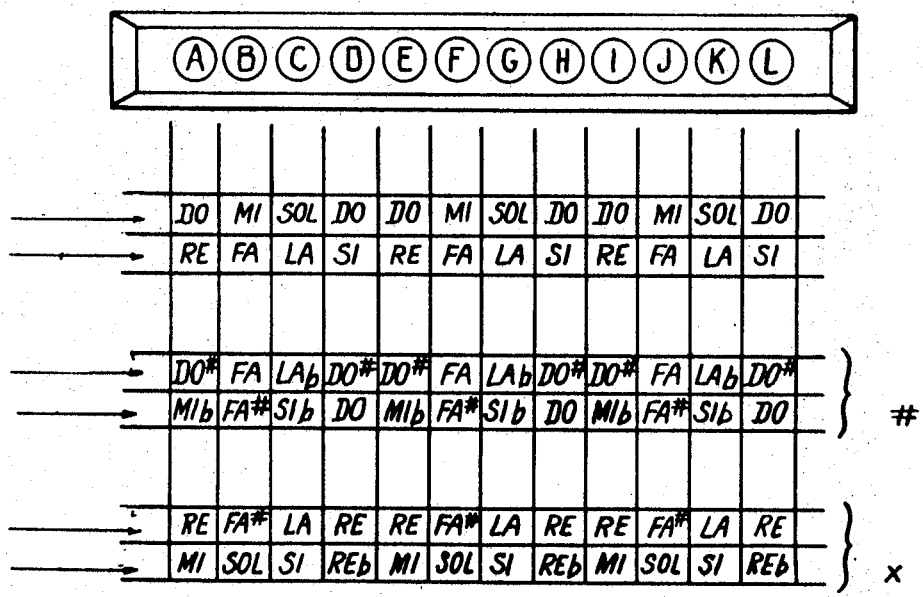

In order that the invention may be more fully understood, some embodiments in accordance therewith will now be described, by way of example, with reference to the accompanying drawings, in which:

FIG. 1 is a plan view of an electronic harmonica of the invention;
FIG. 2 is a front elevation of the same harmonica;
FIG. 3 is a plan view similar to FIG. 1 with the upper part of the casing removed showing the internal components;
FIG. 4 is a section along the line IV—IV of FIG. 3;
FIG. 5 is a sectional view similar to FIG. 4 showing an alternative embodiment;
FIGS. 6, 7, 8 and 9 are detailed views showing other variants of an element of the harmonica;
FIG. 10 is a section along theline X—X of FIG. 3;
FIG. 11 is a circuit diagram of the harmonica of the previous figures; and
FIG. 12 is a front view of the row of holes and their corresponding notes with or without sharpening.

Referring to FIGS. 1 to 4, it will be seen that the electronic harmonica of the invention has an overall shape and size comparable with those of a conventional harmonica. It comprises an inner body 1 in which are formed twelve parallel holes A to L open towards the front (FIG. 2), and which carries the various elements and component parts. The assembly is housed in a casing having an upper half 2 and a lower half 3 through which pass the various operating buttons or switches.

An electronic circuit is incorporated in the harmonica shown, which circuit comprises at least one oscillator and an assembly of elements associated with each of the holes A to L. The purpose of these elements is to transform the pressure increases or decreases produced in the holes by the player into determined electrical oscillations. It is clearly advantageous to complete the electronic circuit by additional stages known in themselves, e.g. amplifier, frequency divider or multiplier, etc. as in the example shown.

It is also possible to connect the harmonica output to a separate power amplifier by means of a cable 4.

The portion of the harmonica which can be regarded as mechanical can be seen more clearly in FIG. 4 which is a broken section through the hole B.

At the inner end of each hole such as B is located a device 5 sensitive to air pressure variations in the hole concerned. In FIG. 4 the device 5 comprises two parallel cylinders 6 and 7, one directed upwardly and the other downwardly from the hole B. In each cylinder is housed a piston 8, 9, these pistons being fixed respectively to piston rods 10, 11.

The cylinder 7 communicates with the hole B below the piston 8, while the cylinder 6 communicates with the hole B above the piston 9. The latter cylinder is, moreover, open to the atmosphere at 12 below the piston 9.

The pistons are not accurately fitted in the cylinders and there therefore exists a small air passage through the cylinders 6 and 7 by-passing the pistons.

The upper ends of the piston rods 10, 11 are normally flush with the upper face of the body 1.

Two flexible leaves 13 are associated with each hole such as B, the leaves being fixed by one end 13a only to the body 1 near to the mouth of the hole B and staggered in the longitudinal direction. Each leaf 13 normally rests on the upper face of the body 1 and covers the end of one of the rods 10, 11. As can be seen in FIG. 3 the leaves are staggered to either side of the axis of the hole B, as are the cylinders 6, 7. The cylinders can, if desired, be arranged along the axis of the hole B and a single leaf 13 used for each of the holes A to L.

The flexible leaves 13 are not vibrating reeds, their sole function being to rise to a certain height, either under the action of the rod 10 when, by blowing into a hole, the piston 8 is caused to rise, or under the action of the rod 11 when, by sucking on a hole, the piston 9 is caused to rise.

A bar 14 of eectro-conductive material rests on all of the leaves 13 in the vicinity of their free ends. This bar, the ends of which are bent at right angles, is connected to a spindle 15 near to the fixing points 13a of the leaves. Its points of contact with the leaves 13 can be likened to as many relay contacts. A spring 15a which bears on the body 1 urges the bar 14 into its position against the leaves.

If any one of the leaves 13 is raised, it causes the bar 14 to rise, which latter ceases to be in contact with the leaves, with the exception of the one which has caused it to rise. Thus, in this example, all the contacts of the leaves 13 with the bar 14 are opened, with the exception of that corresponding to the hole B in use.

Opening of the various contacts according to the hole on which the player blows or sucks imparts determined values to an electronic component inserted in the oscillator circuit. The oscillator in turn oscillates at a determined frequency which corresponds directly or after transformation to the note which it is desired to produce.

Before explaining the manner in which the value of a component of the oscillator circuit is varied in this example, the arrangement of the electronic circuit of the harmonica of the invention will be described.

The diagram of this circuit is shown in FIG. 11. The circuit comprises an oscillator stage O, an amplifier stage A, a first frequency divider stage D1, a second frequency divider stage D2 and a source S of direct current.

The major portion of these stages is conventional in the electronic field and particularly in the field of audible sound generators. These different stages will therefore be described only very briefly, but emphasis will be placed on the particulate features relating to the invention.

Most of these components are carried by the body 1, which is preferably made from a dielectric material so as to avoid any appreciable capacitive or resistive losses.

The oscillator stage is an emitter coupled multivibrator comprising two silicon NPN transistors T1 and T2. It emits signals rich in harmonics and covers a range of three octaves obtained by adjusting a variable resistance RE.

The so-called variable value component, designated by the reference R, is connected in series with the variable resistance RE. It is composed of twenty-one ohmic resistances R1 to R21 connected in series.

A corresponding leaf 13 is connected to each end of these resistances and most often to the junction point of two successive resistances. The bar 14 is also shown in this figure and the fact that it normally touches the leaves 13 is diagrammatically represented by contacts in parallel which are normally closed. At its left-hand end in the drawing the bar is shown as being capable of mechanical displacement while being connected electrically to the primary of the transformer TR and, through the resistance RP to the base of the transistor T1. The opposite end of the component R, in this case, the free end of the resistance R1, is connected to the base of the transistor T2 through a fixed resistance R$b$ and the variable resistance RE.

It is clear from FIG. 11 that when a leaf 13 is raised, pivoting towards the right in the figure, it moves with it the bar 14 (which actually pivots, as seen above, about the spindle 15). As a result all the other contacts are open and the effective resistance in circuit of the resistance R becomes equal to the sum of the individual resistances situated to the right (when looking at the drawing) of the leaf 13 which has moved the bar 14.

Thus, a determined value of the resistance R (the sum of a certain number of individual resistances) and an oscillation frequency of the stage O correspond to each leaf 13 raised.

The harmonica of the invention could be limited to the elements so far described and be connected by a cable to a separate amplifying and filtering apparatus. It is, however, preferable, as in this embodiment, to broaden the possibilities of the instrument itself.

In FIG. 11 there will be seen a variable inductance SV between the bar 14 and the collector of the transistor T1 and in series with the primary of the transformer TR. It will also be seen in FIG. 3 with a plunger core 16 held between two resilient blades 17. These latter extend towards the right where they are hinged on a plate 18 projecting outside the casing portions and movable as shown by the arrows F. The inductance is for effecting manual vibrato, its advantage being that its operation does not result in any mechanical wear. It enables the frequency of the emitted note to be altered either up or down by a semi-tone.

The collector of the transistor T1 is connected to the base of the transistor T2 by three condensers C1, C2, C3. The two latter are each placed in circuit respectively by switches D1, D2. These switches can be manipulated from the exterior of the instrument by buttons 19, 20 visible in FIGS. 1 to 3. The buttons are mounted on the vibrato control plate 18 and move with it. As will be seen from FIG. 3, it is thus easy to close or open the switch D2 for example by operating the button 19, whilst moving the plate 18. Placing in circuit the condensers C2, C3 alters the time constant of the oscillator circuit, which enables the notes produced to be changed. The condensers C1, C2, C3 are normally in circuit. When one of the buttons, for example the button 19, is pressed, the switch D1 opens, so that only the condensers C1 and C3 are connected and sharpening of the notes is obtained.

When the two buttons 19, 20 are pressed, the two switches D1 and D2 open, so that only the condenser C1 remains in circuit and double sharpening of the notes is obtained.

Operation of the oscillator, which is fed by a battery 21 housed in the lower casing 3, is effected by means of a general switch I$g$ operable by means of a button 22 outside the casing (FIG. 1). As soon as this switch is closed the oscillator produces the note of highest pitch (the D$o$7 in this case for the highest register) since the resistances R1 to R21 are short-circuited by the bar 14 and the oscillation frequency increases proportionally to the decrease in the value of the resistance R.

In order that this note should not be permanently emitted, a switch I$a$, called an attack switch, is provided, which is closed by the raising of the bar 14, as seen in FIG. 3. In fact, the switch I$a$ is only closed when the bar 14, raised by one of the leaves 13, has ceased to be in contact with the other leaves, i.e. when the oscillation frequency has been determined by the value of the resistance R.

In this example, the attack switch I$a$ is located in the amplifier stage A. It can of course be located in another circuit, its operation by the bar 14 being unchanged.

With a conventional harmonica, the intensity of the emitted note depends directly on the force with which the player sucks or blows on the holes of the instrument. This property is retained in the harmonica of the invention due to the presence of a photoresistance PHR which can be illuminated by the light rays from a lamp $l$ concentrated by a lens L. Between the lens and the photoresistance PHR is interposed a movable shutter 23 of variable opacity. This shutter 23 is fixed at one end to the spindle 15 with which it turns when the bar 14 is raised so that it exposes the photoresistance PHR to a progressively increasing amount of light from the lamp $l$.

In this manner, the intensity of the signal produced by the amplifier A is constantly proportional to the sucking and blowing force applied by the player. In the present example, when the shutter 23 completely masks the lamp $l$, the internal resistance of the photoresistance is very high and diminishes to a value of 3000 ohms when the shutter 23 allows the maximum amount of light to pass.

It is desirable that the lamp $l$ shall not use energy from the battery 21 to no purpose when the instrument is not being played. To this effect, the illumination of the lamp can be controlled by a switch I$l$ (see FIG. 3) located beside the attack switch I$a$ and also operated by the raising of the bar 14.

The electronic circuit incorporated in the harmonica described as an example of one embodiment of the invention, also includes other improvements.

There is in the oscillator stage a three position switch CTR ganged to two circuits, three resistances RT1, RT2, RT3 and RC1, RC2, RC3 connected respectively to the bases of the transistors T1 and T2 corresponding to the three positions of the switch.

By using the resistances RT1 and RC1 the register of the S$ib$ range from S$ib$2 to S$ib$6 inclusive is obtained.

By using the resistances RT2 and RC2 the register of the U$t$ range from D$o$3 to D$o$7 inclusive is obtained.

By using the resistances RT3 and RC3 the register of the M$ib$ range from M$ib$3 to M$ib$7 inclusive is obtained.

This register transposition or operation of the switch CTR is effected by means of a three position button 24 (FIG. 1) located on the upper part of the instrument in the vicinity of the vibrato plate 18.

As is known, the registers could cover the same range starting from another note. Similarly, two variable resistances RTA and RCA enable the instrument to be tuned.

At the oscillator output, the signal picked up at the secondary of the transformer TR passes through the condenser C10 and is then amplified by the transistor T7.

The signal taken from the collector of the transistor T7 is fed through a condenser C11 to the photoresistance, and also through a condenser C4 to a first frequency divider D1. The latter comprises two NPN type switching transistors and is capable of bringing the register range to the octave below, i.e. from D$o$2 to D$o$6 inclusive.

In this stage D1, a resistance R25 acts, together with the resistances R26 and R27 of the transistor collectors, as a voltage divider. The signal taken from the collector of T3 is fed, through a filter constituted by a condenser C6 and a resistance R23, to the terminal M of an octave switch C$o$cT. A condenser C8 and a resistance R24 enrich the harmonics of this signal coming from the oscillator stage.

The output signal from the first divider stage D1 is fed by a condenser C5 to a second divider stage D2 comprising two transistors T5 and T6.

On leaving the transistor T5 through its collector, the divided signal is fed by a condenser C7 and a resistance R22 to the terminal G of the octave switch C$o$cT. The condenser C8 enriches the harmonics of the signal coming from the stage D2.

The octave switch is operated by a button 25 mounted on the upper part of the instrument. The button 25 has three positions which correspond respectively to the three terminals A, M, G of the octave switch.

In the position A, only the signal coming from the basic oscillator is used and in this example the range goes from D$o$3 to D$o$7 (D$o$3=256 c./s.) (high).

In the position M, the range goes from D$o$2 to D$o$6 inclusive (medium).

In the position G, the range goes from D$o$1 to D$o$5 inclusive (low).

It will be observed that the three position octave switch is ganged to two circuits, the second circuit also having three terminals A′, M′, G′. The terminal A′ is connected to the terminals M and M′. Moreover, a switch C operable from the exterior by a button 26, when closed, enables the second circuit of the C$o$cT to be connected to its first circuit. There are then obtained together both the chosen register and that of the octave below.

Finally, as is conventional in this art, the selected signal, after having passed through the progressive photoresistance, is fed to a series of filters which produce different tone qualities according to the capacitances and inductances place in or outside the circuit. This choice can be made by means of a certain number of switches I$b$, I$c$, I$d$, I$e$, I$f$, I$h$ which are manipulated from the exterior by corresponding buttons 27, 28, 29, 30, 31.

The signal having thus been amplified and treated can be fed through the cable 4 to an amplifier.

FIG. 12 is a table indicating the notes which can be emitted by the harmonica described above when used in the normal way by blowing and sucking on the holes A to L.

There will now be indicated the values of the principle components forming part of the oscillator diagram of FIG. 11.

Resistances:
    RTA—4 kilohms
    RCA—500 ohms
    RT2—2.2 kilohms
    RT3—4.2 kilohms
    R$p$—2.2 kilohms
    R$a$—4.7 kilohms
    RC1—525 ohms
    RC2—250 ohms
    RC3—0 ohms
    R—from 0 to 250 kilohms
    RE—5000 ohms
    R$b$—30 kilohms Condensers:
    C1=C2=C3—10,000 pf.
    C10—10,000 pf.

Transformer TR:
    Primary=2800 turns of wire of 0.05
    Secondary=200 turns of wire of 0.05
    On ferrite core of $\phi$7 mm. and 1=20 mm.

Variable inductance SV:
    3800 turns of wire of 0.05
    On ferrite core of $\phi$8 mm. and 1=20 mm.

The other stages such as the amplifier A and the frequency dividers D1 and D2 are well known and consequently the values of their components will not be indicated.

The transistors are as follows:

T1, T2—2N706 (NPN of silicon-Sesco)
T3, T4, T5, T6—NR2 (NPN of germanium)
T7—927A (NPN of silicon)

It will be easily understood that numerous variations can be made to the electronic circuit incorporated in the harmonica of the invention, and it can be made more simple or more complex in accordance with the art of treating oscillations at musical frequencies. Similiarly, the supply source S can be independent of the harmonica or replaced by a stabilised supply taken from the mains and connected to the harmonica by a cable.

It is, moreover, possible to modify the essential characteristics of the invention by replacing them with equivalent features. Some limited examples thereof will now be given with reference to FIGS. 5 to 9.

The device 5 which is sensitive to variations of pressure in the holes such as B can be constituted by opposed bellows as shown in FIG. 5.

An upper bellows 32 is attached by its lower open end to the periphery of a passage 33 opening into the hole B, while a lower bellows 34 is attached by its upper open end to the periphery of a passage 35 also opening into the hole B.

The bellows 32 is normally collapsed, while the bellows 34 is normally expanded. The free end of the bellows 32 is connected directly to a leaf 13 and that of the bellows 34 connected indirectly by a bent rod 36 to the same leaf. There is a small diameter hole 37 through the wall of the hole B, and this forms a small air passage by-passing the device 5, i.e. the bellows 32 and 34.

When a player blows into the hole B, the bellows 32 is inflated and raises the leaf 13. When the player sucks, the bellows 34 collapses and also raises the leaf 13. The hole 37 allows air to circulate, which is necessary in both cases, since the bellows 32 and 34 are airtight. This embodiment of the device 5 is preferable to that shown in FIGS. 1 to 3, since it ensures, in effect, a positive separation between the electronic circuit and the holes A to L of the instrument in which a certain amount of condensation always forms. If the latter spreads inside the harmonica, it could be very troublesome. On the contrary, with the embodiment of FIG. 5 the condensed liquid cannot penetrate into the harmonica, but can escape directly through the hole 37.

FIGS. 6 to 9 show examples of the use of pistons, as in FIGS. 1 to 3, but with frictionless seals giving the same advantage as the bellows.

To each piston 8, 9 or to its rod 10, 11 is fixed the edge of a hollow sleeve 38 of impermeable and flexible material, e.g. rubber. The opposite edge of this sleeve is fixed to the wall of the corresponding cylinder. As an alternative, a sleeve 39 of easily compressible foam having non-communicating cells can be used (FIG. 9). The end faces of this sleeve are fixed by means of an adhesive to the piston and end wall of the cylinder at 40 and 41 respectively.

In all these cases, the desired result is obtained, namely prevention of the passage of condensed liquid to the interior of the harmonica.

It is clear that different modifications can be made to the shape of the parts and to their relative dispositions. In particular, the inner body 1 could be split into separate juxtaposed elements each having a hole connected to two opposed cylinders housing the pistons or the bellows. The invention is thus not limited to the embodiments described and shown, but covers all modifications or equivalents falling within its scope.

What is claimed is:

1. An electronic harmonica comprising a casing having at least one row of separate playing holes, a plurality of leaves disposed respectively at the inner ends of the holes, an air pressure sensitive device disposed in each hole, elements each forming a part of said device and being movable in response to air pressure variations, each said element being arranged to produce corresponding movements in a respective one of said leaves, and an electronic circuit comprising at least one oscillator stage, a variable value electronic component included in said stage, the effective value of said component being modified by the movement of each leaf whereby deviations from atmospheric pressure produced in a given hole by playing the harmonica are transformed into electrical oscillations corresponding to the note which it is desired to produce.

2. A harmonica according to claim 1, wherein each pressure sensitive device comprises a group of two parallel pistons, a rod extending from each piston and cooperating with the leaf of the hole in which said device is disposed, two cylinders arranged in opposition and respectively housing the pistons, each cylinder opening into said hole, one of the piston moving under the effect of an increase in air pressure and the other under the effect of a decrease in air pressure, these movements being in a direction such as to raise the leaf of said hole.

3. A harmonica according to claim 1, wherein each pressure sensitive device comprises a deformable double bellows, and a rod at each end of said bellows cooperating with the leaf of the hole in which said device is disposed, one part of the bellows expanding under the effect of an air pressure increase and the other collapsing under the effect of a pressure decrease, and both movements being in a direction such as to raise the corresponding leaf.

4. A harmonica according to claim 1, wherein small air passages lead respectively into each hole and by-pass the air pressure sensitive device therein.

5. A harmonica according to claim 1, comprising a group of ohmic resistances constituting the variable value component, and relays associated respectively with the resistances and each actuated by a corresponding leaf.

6. A harmonica according to claim 5, wherein the resistances are connected in series, and further comprising a common conductor between which and each end of the individual resistances the relays are connected in parallel.

7. A harmonica according to claim 5, wherein one of the contacts of each relay is constituted by the leaf itself, and further comprising a pivotally mounted conducting bar electrically connected at one end to one terminal of the oscillator circuit, the other end furthest removed from the group of resistances being connected to the other terminal of the oscillator circuit, portions of said bar constituting further relay contacts.

8. A harmonica according to claim 1, further comprising an inductance winding in the oscillator circuit, an inner core of said winding and manual control means operable from the exterior of the instrument for pushing the core into the winding.

9. A harmonica according to aclaim 1, wherein the electronic circuit furtehr comprises within the casing an amplifier stage in addition to and coupled to the oscillator stage.

10. A harmonica according to claim 7, further comprising a shutter of variable opacity fixed to the pivoting bar and a light source and a photoresistance connected in the electronic circuit, between which source and resistance the shutter is interposed.

11. A harmonica according to claim 7, further comprising at least one switch incorporated in the electronic circuit and operated by the pivoting bar.

12. A harmonica according to claim 1, wherein the electronic circuit further comprises at least one and preferably two frequency dividers disposed within the casing.

References Cited

UNITED STATES PATENTS

| | | | |
|---|---|---|---|
| 2,664,775 | 1/1954 | Zielinski | 84—1.04 |
| 2,868,876 | 1/1959 | Ticchioni | 179—1 |
| 3,322,875 | 5/1967 | Roll et al. | 84—1.14 |
| 3,402,251 | 9/1968 | Bright | 84—1.13 |
| 3,457,357 | 7/1969 | Selmer | 84—1.04 |

WARREN E. RAY, Primary Examiner

U.S. Cl. X.R.

84—1.13, 1.14, 1.18, 1.25, 1.26